United States Patent [19]

Higginbotham

[11] Patent Number: 4,621,435
[45] Date of Patent: Nov. 11, 1986

[54] SILL ATTACHMENT UNDERFRAME MEASUREMENT SYSTEM

[76] Inventor: Alan V. Higginbotham, 21 Kempe Parade, Kings Langley, New South Wales 2147, Australia

[21] Appl. No.: 681,944

[22] Filed: Dec. 14, 1984

[51] Int. Cl.⁴ .................................................. G01B 5/00
[52] U.S. Cl. ..................................... 33/520; 33/203.2; 33/288; 33/191
[58] Field of Search ................ 33/520, 533, 288, 189, 33/191, 203.17, 203.2

[56] References Cited

U.S. PATENT DOCUMENTS

| | | | |
|---|---|---|---|
| 352,693 | 11/1886 | Irving | 33/189 |
| 875,341 | 12/1907 | Frank | 33/191 |
| 2,581,021 | 1/1952 | Jacobsen et al. | 33/288 |
| 3,869,804 | 3/1975 | Friend | 33/288 |
| 4,098,003 | 7/1978 | Negrin | 33/288 |
| 4,413,420 | 11/1983 | Hoffman et al. | 33/203.17 |

*Primary Examiner*—William D. Martin, Jr.
*Attorney, Agent, or Firm*—Ladas & Parry

[57] ABSTRACT

The present invention discloses an apparatus for the measurement of the underframe of a motor vehicle. The apparatus takes the form of a pair of "roof racks" able to be suspended underneath the vehicle by the door sills. A longitudinal arm carrying a pointer is able to be radially swung about a central pivot point and/or slid from side to side to enable comparison measurements of corresponding left and right side portions of the vehicle to be taken.

7 Claims, 3 Drawing Figures

SILL ATTACHMENT UNDERFRAME MEASUREMENT SYSTEM

The present invention relates to an apparatus for the measurement of the underframe of a motor vehicle. Such an apparatus finds particular use in a panelbeating shop or other motor vehicle repair establishment. However, the present invention is not limited thereto and also finds application in the manufacture of motor vehicles, especially small volume manufacture.

It is often the case when a motor vehicle is damaged, that only one side, for example the left front of the motor vehicle is damaged and the other side, the right front is undamaged. Therefore in beating a panel to restore same to its original shape, the panelbeater has a ready reference in the undamaged corresponding portion of the vehicle. However, the difficulty arises as to how to translate from the referenced portion to the damaged portion which is under repair in order to measure with substantial precision whether the damaged portion needs to be moved forwardly, rearwardly, outwardly or inwardly.

It is the object of the present invention to provide an apparatus for the measurement of the underframe of a motor vehicle which will enable such a comparison to be made which relative simplicity based upon the fact that during modern motor vehicle manufacture, the underframe of the car is made with great accuracy and therefore the position of the door sills is known with considerable accuracy.

According to one aspect of the present invention there is disclosed an apparatus for the measurement of the underframe of a motor vehicle, said apparatus comprising a first transverse member having a longitudinal extent comparable with the width of said motor vehicle, each end of said first transverse member being provided with an upwardly extending arm shaped to grip the corresponding door sill of said motor vehicle whereby said first transverse member can be suspended under said vehicle by engagement of said arms with said door sills, and a longitudinal arm engaged with said first transverse arm for movement relative thereto whereby movement of said longitudinal arm enables a direct comparison to be made between the location of one portion to one side of said vehicle and the location of the corresponding portion on the other side of said vehicle.

An embodiment of the present invention will now be described with reference to the drawings in which:

FIG. 3 illustrates a modified form of the pointer arrangement carried by the longitudinal arm.

Figure 1:
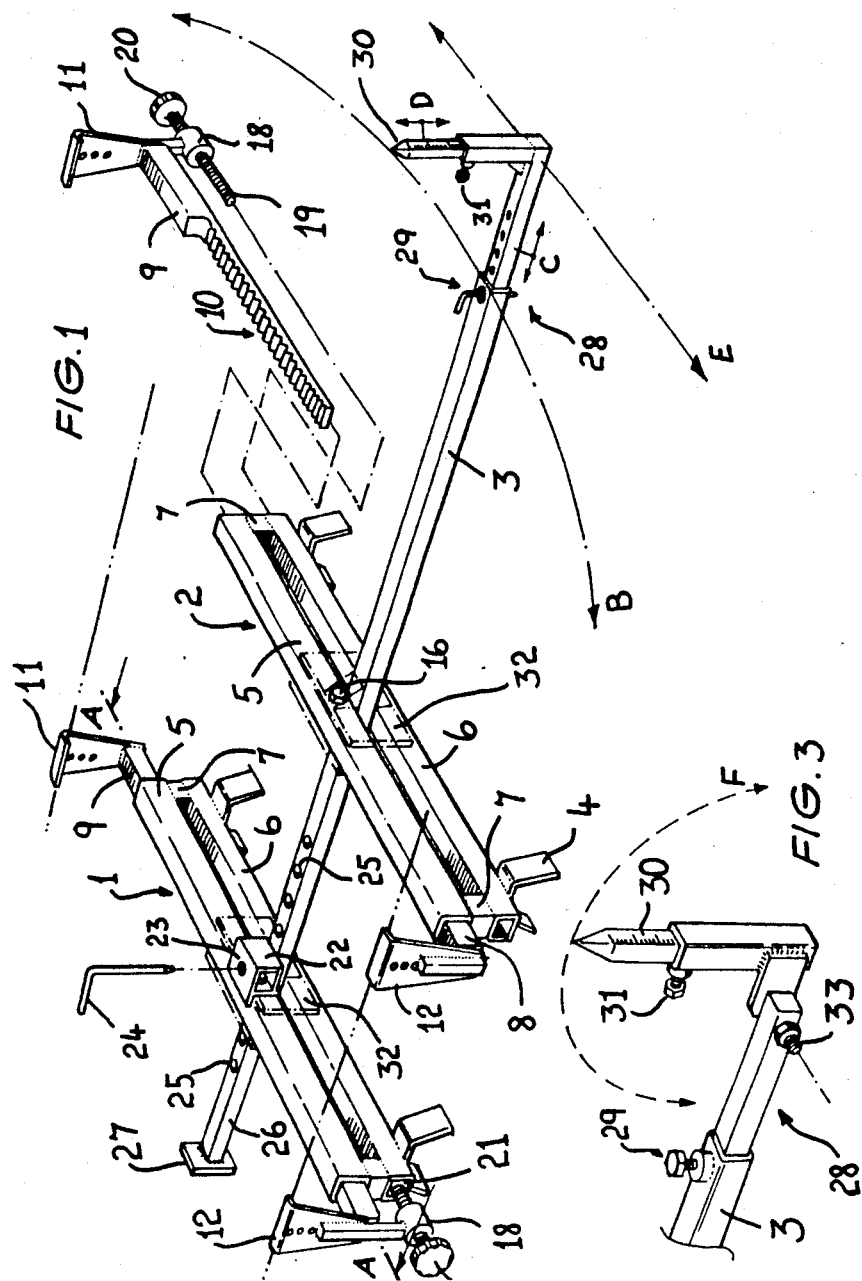
FIG. 1 is an exploded perspective view from above of the apparatus of the preferred embodiment.
Figure 2:
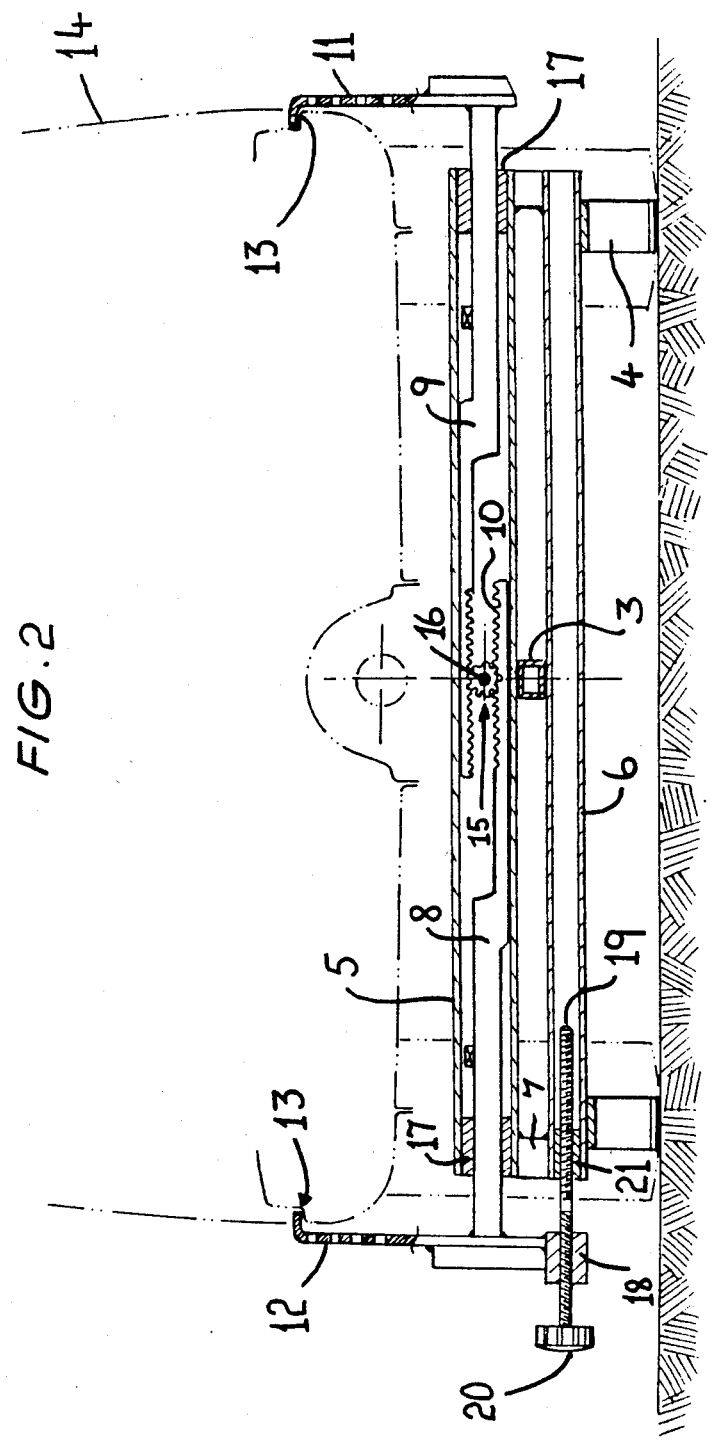
FIG. 2 is a cross-sectional view taken along the line A—A of FIG. 2 and illustrating the apparatus secured to a motor vehicle which is illustrated in phantom.

Turning first to FIGS. 1 and 2, the apparatus of the preferred embodiment may be generally likened to a pair of inverted roof-racks which are suspended from the underside of the vehicle and which support a longitudinal arm. As best seen in FIG. 1, the "roof-racks" take the form of first and second transverse members 1 and 2 which carry a longitudinal arm 3. Each transverse member 1, 2 is provided with a pair of stands 4 which prevent the transverse members 1, 2 toppling over when not engaged with a motor vehicle.

Each of the transverse members 1, 2 is substantially identical and is formed from two tubular spaced apart parallel bars 5, 6 which are connected together by means of blocks 7 welded between their respective ends.

As best seen in FIG. 2, the upper bar 5 has two links 9, 10 partially inserted therein, the interior end of each of the links 8, 9 being formed into a rack 10. The other end of each of the links 8, 9 carries an upwardly extending hook-shaped arm 11, 12. The hook shaped arms 11, 12 are shaped to grasp the door sills 13 of a motor vehicle 14.

Centrally located within the tubular bar 5 is a pinion gear 15 which is located by means of a bolt 16 extending transversely across the tubular bar 5. The racks 10 engage the pinion gear 15 on opposite sides thereof with the links 8, 9 being slidably engaged in bushes 17.

It will be apparent that longitudinal reciprocation of the links 8, 9 adjusts the distance between the hook-shaped arms 11, 12 so as to permit same to grasp cars of different width. However, the arrangement of the racks 10 and pinion gear 15 ensures that the bolt 16 passing through the pinion gear 5 is always centrally located under the centre of the motor vehicle as illustrated in FIG. 2.

In order to provide for reciprocal movement of the links 8, 9, one of the links of each of the transverse members 1, 2 is provided with a depending internally threaded bush 18 through which a threaded rod 19 passes. The threaded rod 19 has a handle 20 at one end and its other end passes through another threaded bush 21 secured in the corresponding end of the lower tubular bar 6.

It will be seen from FIG. 2 that the portion of the threaded rod 19 adjacent the handle 20 (and the corresponding bush 18) are threaded with one hand whilst the other end of the rod 19 and its corresponding bush 21 are threaded with the opposite hand. Thus rotation of the handle 20 ensures very rapid movement of the links 8, 9 along the upper bar 5 in the same manner as the rapid advancement of a conventional scissors motor vehicle jack.

Turning now to FIG. 1, at the centre point of the first transverse member 1, a box-like support 22 is centrally located by means of the bolt 16 which passes through the upper bar 5. The support 22 contains two apertures 23 (only one of which is illustrated) adapted to receive a removable locking pin 24.

The locking pin 24 is insertable through the support 22 and also through a selected one of a number of location holes 25 in the longitudinal arm 3. The selected location hole 25 and the locking pin 24 together define a pivot point for the longitudinal arm 3 which permits same to be pivoted as a radial arm along the arc illustrated by arrow D in FIG. 1.

One end 26 of the longitudinal arm 3 carries a stop plate 27 whilst the other end 28 of the arm 3 is telescopically adjustable (as indicated at 29) so as to be movable in the direction of arrow C of FIG. 1. In addition, the other end 28 also carries a pointer 30 which is slidably adjustable (as indicated at 31) in the direction of arrow D of FIG. 1.

It will be apparent to those skilled in the art, that with the apparatus thusfar described, the transverse members 1, 2 can be secured to the door sills of a vehicle so as to extend underneath the vehicle and permit the radial arm 3 to be adjusted so that the pointer 30 together with the arm 3 can be swung between one location (such as a specified point on the left front mudguard) and the corresponding location on the other (right) side of the vehicle. In this way, the precise location of the undamaged part can be compared with the corresponding location of the damaged part so that, if necessary, final adjustments can be made to place both parts in a symmetrical relationship relative to the longitudinal axis of the vehicle.

If it is desired to move the longitudinal arm 3 transversely relatively to the vehicle in the direction indicated by arrows D in FIG. 1, then the support 22 can be removed from the first transverse member 1 by means of undoing the nut retaining bolt 16 in position. In addition, a pair of stop plates 32 (illustrated in phantom in FIG. 1) are secured to the longitudinal arm 3 at each location where it passes between the upper and lower bars 5, 6. The means of securing the stop plates 32 to the arm 3 can take any conventional form and preferably takes the form similar to the locking pin 24 and location holes 25.

Irrespective of the exact structure used, the longitudinal arm 3 is then able to be slid in the direction of arrow E along the transverse members 1, 2 and is simultaneously kept substantially perpendicular thereto. This transverse sliding arrangement permits another class of comparisons or direct measurements to be taken.

Turning now to FIG. 3, an alternative arrangement for mounting the pointer 30 at the other end 28 of the arm 3 is illustrated. The telescopic adjustment 29 and sliding adjustment 31 of the arm 3 and pointer 30 are substantially as before, however, the sliding adjustment 31 is rotatably mounted by means of bolt 33 so as to be rotatable in an arc in the direction of arrow F in a vertical plane as illustrated in FIG. 3. Clearly, if it is desirable to rotate the pointer 30 in a horizontal plane, this can be accomplished by releasing the telescopic adjustment 29, retracting the other end of the arm 28, rotating same by 90°, and then reinserting into the telescopic adjustment 29.

The abovedescribed apparatus offers a number of very substantial advantages. The setting up time of the apparatus is particularly fast being of the order of less than five minutes and the apparatus is able to be used by one man. In addition, the longitudinal arm 3 is accurately self-centreing because of the rack and pinion movement.

The arrangement of the longitudinal arm 3 and pointer 30 ensures that height, length, width and diagonal measurements are all able to be taken of the chassis, underframe and body of the vehicle. This is particularly beneficial since it enables a quick check on the underframe geometry to be carried out for the benefit of insurance assessors in order to indicate the nature of the damage or the accuracy of the repair. Naturally, the apparatus is also useful during the actual repair procedure and can be left set-up whilst the repairs are being completed.

The apparatus is equally suited to either front or rear damage by merely reversing the apparatus and connecting the first transverse member 1 towards the front, rather than towards the rear of the vehicle as illustrated.

Finally, the apparatus described above is suitable for use with all available repair systems, is of very low cost, requires no operator training, and when not in use hangs conveniently from any wall bracket or the like thereby not requiring any storage space.

The foregoing describes only one embodiment to the present invention and modifications, obvious to those skilled in the art, can be made thereto without departing from the scope of the present invention. For example, the hook shaped arms 11, 12 can be releasably secured to the links 8, 9 by means of bolts, or similar fasteners, so as to provide for adjustment of the vertical distance between the door sill 13 and the upper bar 5. The provision of this adjustment is forshadowed by means of the vertically aligned apertures illustrated in the hook shaped arms 11, 12.

Furthermore, if desired a guard may be provided extending from the links 8, 9 and around the threaded bush 18, which guard extends inwardly towards the lower tubular bar 6 so as to provide a hand hold to an operator which enables the tubular members 1, 2 to be grasped without fear of the operator having grease deposited on his hands through inadvertent grasping of the threaded rod 19.

What I claim is:

1. Apparatus for measurement of the underframe of a motor vehicle, said apparatus comprising a first transverse member having a longitudinal extent comparable with the width of said motor vehicle, each end of said first transverse member being provided with an upwardly extending arm shaped to grip the corresponding door sill of said motor vehicle whereby said first transverse member can be suspended under said vehicle by engagement of said arms with said door sills, said transverse member being formed from two portions each longitudinally reciprocable relative to each other and inter-connected by self-centering means whereby the length of said transverse member is adjustable and said self-centering means is located at the center of said transverse member, and a longitudinal arm mounted on said self-centering means of said first transverse arm for both longitudinal and pivotal movement relative thereto whereby longitudinal movement of said longitudinal arm followed by pivotal movement of said longitudinal arm enables a direct comparison to be made between the location of one portion to one side of said vehicle and the location of the corresponding portion on the other side of said vehicle.

2. Apparatus as claimed in claim 1 including a second transverse member having a longitudinal extent comparable with the width of said vehicle, each end of said second transverse member being provided with an upwardly extending arm shaped to grip the corresponding door sill of said motor vehicle whereby said second transverse arm can be suspended under said vehicle by engagement of said arms with said door sills, said transverse member being formed from two portions each longitudinally reciprocable relative to each other and inter-connected by self-centering means whereby the length of said transverse member is adjustable and said self-centering means is located at the center of said transverse member.

3. Apparatus as claimed in claim 1 wherein one end of said longitudinal arm carries a stop means which abuts said first transverse member and maintains said longitudinal arm substantially perpendicular thereto during the sliding movement of said longitudinal arm.

4. Apparatus as claimed in claim 2 wherein the or each transverse member comprises two spaced apart, substantially parallel bars and said longitudinal arm passes between the bars of the pair or both pairs, of bars.

5. Apparatus as claimed in claim 1 wherein the transverse member has a longitudinally extending open ended tubular portion, a pinion gear centrally rotatably mounted within said tubular portion, and a pair of links, each having one of said upwardly extending arms at one end and a rack at the other end, said links being partially inserted, rack end first, into said tubular portion from opposite ends thereof with both racks engaging said pinion gear but on opposite sides thereof.

6. Apparatus as claimed in claim 5 wherein each of said links is longitudinally reciprocable by means of a threaded rod passing through both a threaded bush movable with said link and a threaded bush fixed to said tubular portion, the thread of one of said bushes and the corresponding portion of said rod being of opposite hand to the thread of the other one of said bushes and its corresponding portion of said rod.

7. Apparatus as claimed in claim 1 wherein said longitudinal arm is telescopically adjustable in length and/or carries a pointer at its end remote from said first transverse member and/or the pointer is telescopically adjustable and/or the pointer is rotatable in a plane and/or the apparatus is provided with a stand.

* * * * *